United States Patent [19]

Chapman

[11] Patent Number: 5,009,383
[45] Date of Patent: Apr. 23, 1991

[54] SUSPENDED CEILING ELECTRICAL BRACKET

[75] Inventor: James A. Chapman, Wakefield, Mass.

[73] Assignee: Daniel J. Chapman, Salem, N.H.

[21] Appl. No.: 516,966

[22] Filed: Apr. 30, 1990

[51] Int. Cl.$^5$ .............................................. F16M 13/00
[52] U.S. Cl. ...................................... 248/343; 52/221;
248/27.1; 248/57; 248/906
[58] Field of Search ....................... 248/343, 27.1, 906,
248/57; 220/3.9, 3.92; 52/221

[56] References Cited

U.S. PATENT DOCUMENTS

| | | | |
|---|---|---|---|
| 2,661,677 | 12/1953 | Lingelbach | 248/57 X |
| 3,371,900 | 3/1968 | Jacobs | 248/343 |
| 3,388,247 | 6/1968 | Rackley | 248/343 X |
| 3,567,842 | 3/1971 | Meyer | 52/221 X |
| 3,597,889 | 8/1971 | LoNigro | 52/28 |
| 3,964,705 | 6/1976 | Giovanni | 248/27.1 |
| 4,041,657 | 8/1977 | Schuplin | 52/39 |
| 4,122,762 | 10/1978 | Williams | 248/343 X |
| 4,149,693 | 4/1979 | LoNigro | 248/342 |
| 4,230,900 | 10/1980 | Speet | 248/343 X |
| 4,313,154 | 1/1982 | Capostagno et al. | 248/27.1 X |

*Primary Examiner*—David L. Talbott

[57] ABSTRACT

A suspended ceiling electrical bracket for installation in a grid type suspended ceiling to provide a means for mounting one or more rectangular junction boxes (24) or mounting a single octagonal junction box (48), to which can be installed in such boxes, electrical devices such as electrical outlets, security cameras, emergency lighting, exit signs, and ceiling fans. The invention comprises of a flat rectangular shaped base (10) and upwardly bent lip (12) made of rigid sheet metal which replaces a portion of ceiling tile (28) and is adapted to overlap and mount flush against three adjoining grid elements (26), while allowing three u-shaped hooks (14, 16, and 18) to fit over and be secured to the vertical flanges of the respective grid elements (26). Holes (12A and 12B) are made in the lip (12) and top portion of two hooks (16 and 18), to allows the attachment of cable or chain to the building's structural members that reside above a suspended ceiling. Near the side opposite the lip (12), spans a support angle (20) which is rigidly attached to the base (10), and has a vertical side to which the reinstalled remaining portion of ceiling tile (28) can rest flush against. The central portion of the flat base (10) comprises of one or more punched cutouts along with support means by which can be mounted one or more rectangular junction boxes (24) or a single octagonal junction box (48).

6 Claims, 4 Drawing Sheets

SUSPENDED CEILING ELECTRICAL BRACKET

BACKGROUND OF THE INVENTION

1. Field of the Invention

This invention relates to grid type suspended ceiling systems used in modern buildings, specifically to apparatus used in the nonstructural mounting of electrical junction boxes employed in the installation of electrical outlets, security cameras, exit signs, emergency lighting, and ceiling fans.

2. Background Information

Many modern buildings have grid type suspended ceilings consisting of insertable and removable ceiling tiles supported by spaced, inverted, t-shaped grid elements. In such ceilings, the mounting of electrical junction boxes is required when installing electrical outlets, security cameras, exit signs, emergency lighting, and ceiling fans. The grid elements of such ceilings do not provide a means for attaching and supporting junction boxes and additional apparatus must be employed for attaching and supporting such junction boxes.

U.S. Pat. No. 4,149,693 and U.S. Pat. No. 3,597,889 to LoNigro, and also U.S. Pat. No. 4,041,657 to Schuplin, discloses apparatus consisting of a metal supporting bar which bridges the space between a pair of inverted t-shaped grid elements of a grid type suspended ceiling, and which provides a clip to secure a single junction box to the metal supporting bar. The installation of the metal supporting bar, clip and junction box in a grid type suspended ceiling requires a precise hole to be cut in the ceiling tile which matches the outline of the junction box, and also requires the adjustment of the metal supporting bar, clip and junction box, such that the junction box is aligned with the hole cut in the ceiling tile.

All of the apparatus heretofore known suffer from a number of disadvantages:

(a) Apparatus in present use are limited to supporting a single junction box per metal supporting bar, and the installation of such apparatus and junction box in a suspended ceiling is time consuming, particularly when one must install several apparatus in order to accommodate several electrical devices.

(b) The wiring and attachment of an electrical device to a junction box mounted with such apparatus, requires great effort, since only after such apparatus and junction box is installed in a suspended ceiling, can one wire and attach an electrical device.

(c) Apparatus in present use are unable to provide a balanced means for attaching and supporting a junction box used when installing heavier electrical devices such as ceiling fans or security cameras in a grid type suspended ceiling. Such apparatus fails to support the weight, since it does not provide a balanced means for attaching to the building's structural members that reside above a suspended ceiling.

SUMMARY OF THE INVENTION

The principle object of the present invention is to provide an apparatus which can be installed in a grid type suspended ceiling, and which is capable of providing a balanced means for attaching and supporting:

(a) Several rectangular junction boxes, of a type used in the installation of electrical outlets, security cameras, exit signs, or emergency lighting.

(b) An octagonal junction box of a type used in the installation of a ceiling fan.

Another object is to provide an apparatus which supplies a balanced means for attaching, via cable or chain, to the building's structural members that reside above a suspended ceiling, thus enabling unsurpassed rigidity and support for the installation of one or more electrical devices of considerable weight.

Another object is to provide an apparatus which in use will provide a quicker and easier method of mounting one or more junction boxes, and which can be rapidly installed in a grid type suspended ceiling.

Another object is to provide an apparatus which in use allows an easier way to wire and attach electrical devices to the junction boxes mounted in such apparatus. This is accomplished by allowing one to wire and attach the electrical devices to the mounted junction boxes prior to the installation of both apparatus and junction boxes in a suspended ceiling.

A still further object is to provide an apparatus which in use will allow the mounting of one or more junction boxes in a compact and uncluttered way.

The foregoing objects are accomplished, according to the present invention, by providing a novel bracket support structure consisting of a flat rectangular base of rigid sheet metal, which replaces a portion of ceiling tile, overlapping and attaching to three adjoining, inverted, t-shaped grid elements by means of three downwardly opening u-shaped hooks, which fit over the vertical flanges of the respective grid elements. The u-shaped hooks are tapped so the bracket may be easily fastened to the respective grid elements. The bracket has four holes which provide a balanced means for attaching the bracket, via cable or chain, to the building's structural members. The central portion of the flat base has one or more cutouts along with support means which provide a simple and efficient way of attaching electrical junction boxes of the latter mentioned type. Attached to the flat base is a support angle which provides additional rigidity, and which provides a stopping means for the reinstalled, remaining portion of ceiling tile.

Other and further objects, advantages and features of the present invention will be understood by reference to the following description taken in conjunction with the accompanying drawings.

BRIEF DESCRIPTION OF THE DRAWINGS

FIG. 7 shows a top perspective view of a suspended ceiling electrical bracket for use with rectangular junction boxes.

DESCRIPTION OF PREFERRED EMBODIMENTS

Figure 1:
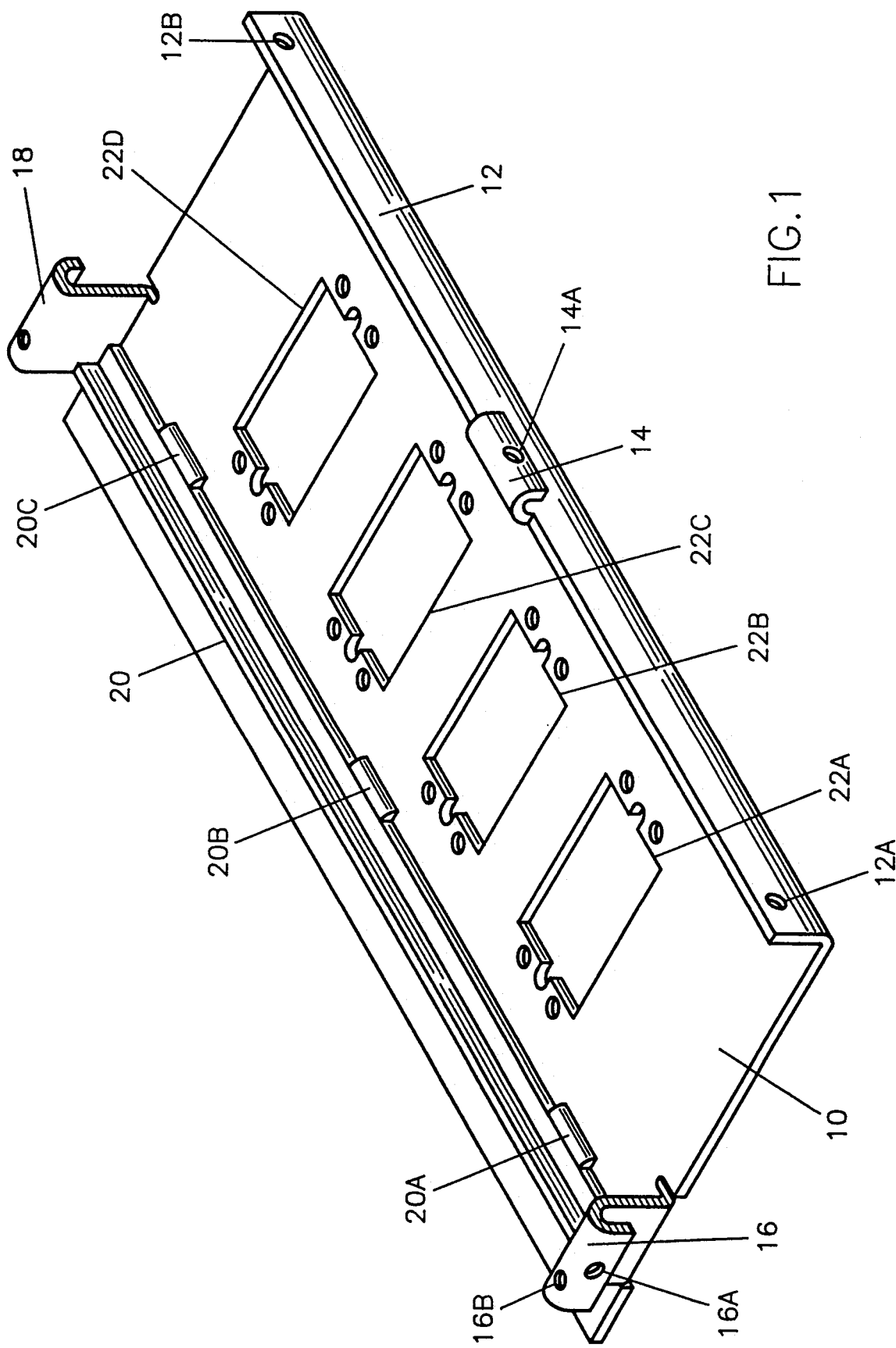

A typical embodiment of a suspended ceiling electrical bracket for rectangular junction boxes, is illustrated in FIG. The bracket shown in FIG. 1 consists of a rectangular shaped base 10 with an upwardly bent lip 12.

Base 10 is of uniform cross section, consisting of rigid aluminum sheet metal two millimeters in thickness, which has a length along lip 12 sufficient to overlap and mount flush against the inside edges of two spaced, inverted, t-shaped grid elements 26 (shown in FIG. 2), and which has a length along its two shorter sides of twenty-three centimeters.

Figure 2:
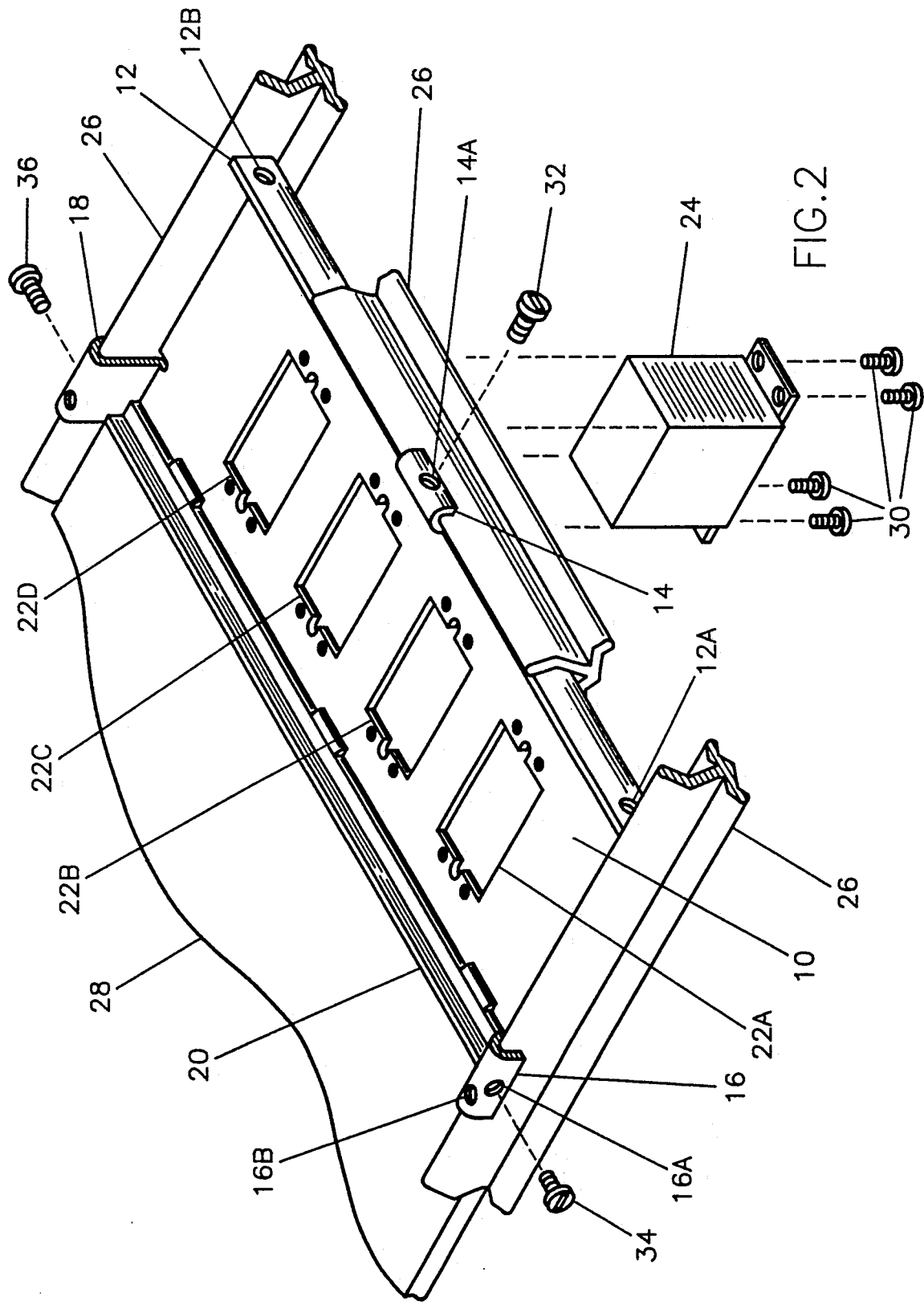
FIG. 2 shows a top perspective view of the bracket in FIG. 1 installed in a grid type suspended ceiling, with a rectangular junction box.

Lip 12 is upwardly bent perpendicular to base 10 with a vertical height typically three-quarters the height of the vertical flange of grid elements 26 (FIG. 2). Holes 12A and 12B are made in the side of the lip 12, while out its central top portion is formed a downwardly opening u-shaped hook 14 with sufficient vertical height and inner radius to fit over the vertical flange of grid elements 26 (FIG. 2), and which has a flat outer portion in which is made a tapped screw hole 14A.

A downwardly opening u-shaped hook 16 is formed out of and flush with the side of base 10, starting sixteen centimeters from lip 12, and with a length along the side of base 10 of four centimeters. The hook is upwardly bent perpendicular to base 10, with sufficient vertical height and inner radius to fit over the vertical flange of grid elements 26 (FIG. 2), and which has a flat outer portion in which is made a tapped screw hole 16A, and which also has a hole 16B made in its top portion.

Hook 18 is formed out of base 10 directly opposite that of hook 16, and which is formed having identical features and dimensions as hook 16.

A support angle 20 spans the distance between hooks 16 and 18, consisting of a vertical side positioned flush with the back edges of hooks 16 and 18, and a horizontal side which is rigidly secured to base 10, via welds 20A, 20B and 20C. The support angle is made of the same material and thickness as base 10, and is typically two centimeters on each side.

Cutout patterns 22A, 22B, 22C and 22D are punched out of the central portion of base 10. Each cutout pattern consists of a notched rectangular shaped cutout and four tapped screw holes.

The notched rectangular shaped cutout is sufficiently dimensioned to allow the insertion of a rectangular junction box 24 (shown in FIG. 2). The four tapped screw holes made in base 10 are positioned about the notched rectangular shaped cutout, to match up with the corresponding holes of rectangular junction box 24 (FIG. 2), when such box is inserted in the respective cutout.

Figure 3:
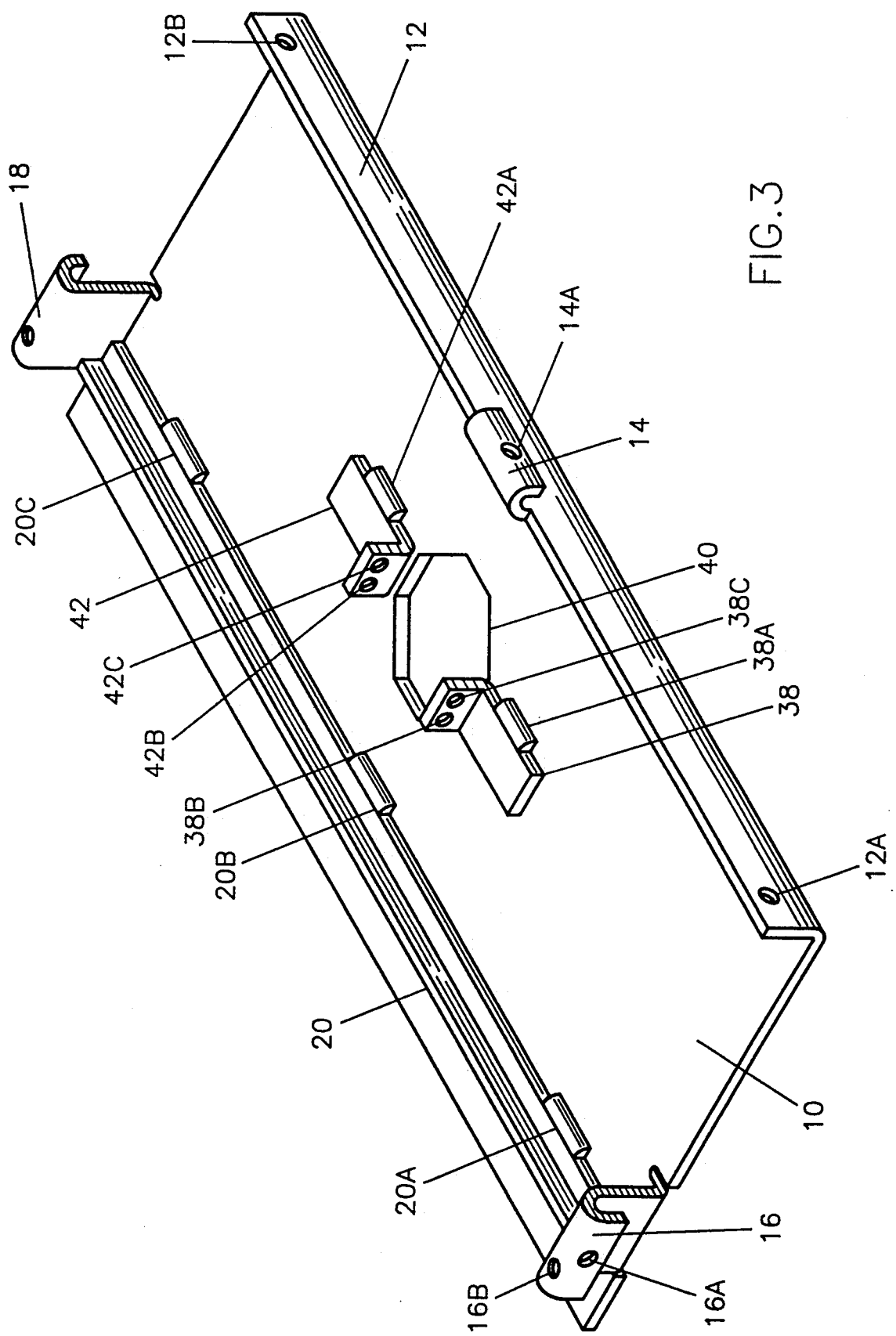
FIG. 3 shows a top perspective view of a suspended ceiling electrical bracket for use with an octagonal junction box, of a type used for a ceiling fan.

Another embodiment of the suspended ceiling electrical bracket is illustrated in FIG. 3, which supports a single octagonal junction box of a type used for a ceiling fan. In this particular embodiment the central portion of base 10 which contained cutout patterns 22A, 22B, 22C, and 22D (shown in FIG. 1 and FIG. 2) in the previous embodiment, is replaced by a single octagonal shaped cutout 40, and a pair of support braces 38 and 42.

Figure 4:
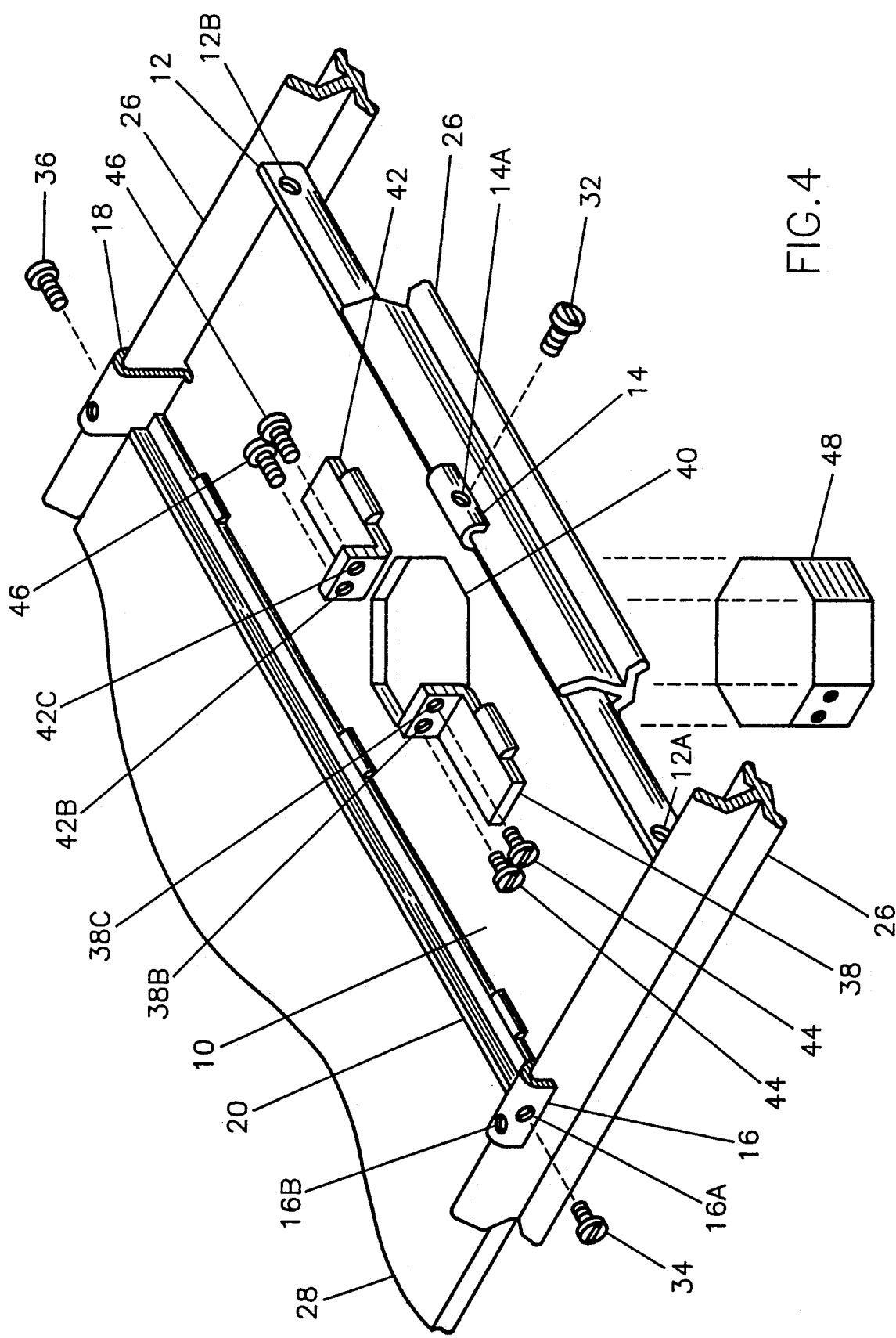
FIG. 4 shows a top perspective view of the bracket in FIG. 3 installed in a grid type suspended ceiling, with an octagonal junction box, of a type used for a ceiling fan.

Octagonal shaped cutout 40 is punched out of the central portion of base 10, and is sufficiently dimensioned to allow the insertion of octagonal junction box 48 (shown in FIG. 4). Support braces 38 and 42, are each formed with a flat horizontal portion and an upwardly bent vertical flange, and are made of the same material and thickness as base 10. With the vertical flanges of the support braces positioned flush with the respective edges of the octagonal shaped cutout, the horizontal portions are rigidly secured to base 10, via welds 38A and 42A, and by welds (not shown) on edges directly opposite welds 38A and 42A. The vertical flanges are made having dimensions of height and width equal to the respective sides of octagonal junction box 48 (FIG. 4).

Screw holes 38B, 38C and 42B, 42C are made in the vertical flanges of support braces 38 and 42, and are located to match up with the corresponding holes in the sides of octagonal junction box 48 (FIG. 4), when such box is inserted in the respective cutout with its bottom portion flush with the bottom surface of base 10.

INSTALLATION

The installation of a suspended ceiling electrical bracket for rectangular junction boxes is illustrated in FIG. 2. Prior to the installation of the bracket in a grid type suspended ceiling, the rectangular junction boxes are mounted in the bracket's rectangular shaped base 10. The mounting of such boxes is accomplished through the insertion of a rectangular junction box 24 into each notched rectangular shaped cutout of cutout patterns 22A, 22B, 22C, and 22D, and then rigidly securing each inserted junction box by inserting screws 30 through holes in the junction box and into the matching tapped screw holes of each cutout pattern. A variety of electrical devices (not shown) can now be wired and attached to the mounted junction boxes.

Once the electrical devices (not shown) are wired and attached to the mounted junction boxes, the bracket can be installed in the suspended ceiling. Ceiling tile 28 is removed from the suspended ceiling's grid elements 26, allowing the bracket's rectangular shaped base 10 and lip 12 to be installed, overlapping and mounting flush against grid elements 26. At the same time hooks 14, 16, and 18 are fitted over the vertical flanges of the respective grid elements, and are rigidly secured to such grid elements by inserting screws 32, 34, and 36 into the tapped screw holes that reside in the flat outer portion of each hook.

If additional support is needed, cable or chain (not shown) can be attached through holes in the top portions of hooks 16 and 18, and through holes 12A and 12B in the side of lip 12, to the building's structural members (not shown) that reside above a suspended ceiling.

After the bracket is installed in a suspended ceiling, and is rigidly secured to the suspended ceiling's grid elements and/or building's structural members, ceiling tile 28 is cut and reinstalled in the suspended ceiling. The ceiling tile is cut to a length such that when reinstalled it will overlap the bracket's side opposite lip 12, and rest flush against the vertical side of support angle 20.

The installation of a suspended ceiling electrical bracket for an octagonal junction box of a type used for a ceiling fan is illustrated in FIG. 4. Prior to the installation of the bracket in a grid type suspended ceiling, an octagonal junction box is mounted in the bracket's rectangular shaped base 10. The mounting of such junction box is accomplished through the insertion of octagonal junction box 48, into octagonal shaped cutout 40, and then rigidly securing the inserted junction box by inserting screws 44 and 46 through the corresponding screw holes 38B, 38C, and 42B, 42C of support braces 38 and 42, and into matching holes in the sides of the inserted octagonal junction box, and then securing with lock nuts (not shown). A ceiling fan (not shown) can now be wired and attached to the mounted junction box.

Once the ceiling fan (not shown) is wired and attached to the mounted octagonal junction box, the bracket is installed in a suspended ceiling in the same manner as previously described in the installation of the bracket for rectangular junction boxes.

Accordingly, the reader will see that the suspended ceiling electrical bracket of the present invention provides a rigid support structure which can be rapidly installed in a grid type suspended ceiling attaching to the grid elements and to the building structural members that reside above such a ceiling, and which provides a balanced support means for mounting several rectangular junction boxes used to install a variety of electrical devices or mounting an octagonal junction box used for a ceiling fan, quickly and easily, and in a compact and uncluttered way.

Although the description above contains many specificities, these should not be construed as limiting the scope of the invention but as merely providing illustrations of some of the presently preferred embodiments of the invention.

For example, the suspended ceiling electrical bracket of the present invention can have other embodiments, in that:

(a) the suspended ceiling electrical bracket could be made of other rigid materials such as steel sheet metal, injection molded plastics, etc.

(b) the suspended ceiling bracket's central portion can have one, two, or three cutout patterns for rectangular junction boxes, and furthermore one can easily provide cutouts and support means in the bracket's central portion to accommodate other types of commonly used electrical junction boxes.

(c) the suspended ceiling bracket's support angle can be rigidly attached to the bracket's base with other means such as structural adhesives, and furthermore the support angle can be replaced by other supportive means which perform the same function, such as forming vertical dimples in the bracket's base, or other ways well known to persons associated with the art of metal working.

It is intended that the scope of the invention should be determined by the appended claims and their legal equivalents, rather than by the examples given.

What is claimed is:

1. A bracket structure for mounting electrical junction boxes
   in a grid type suspended ceiling, comprising: ceiling tiles supported by spaced and adjoining, inverted, t-shaped grid elements; a sheet of rigid material which replaces a portion of said ceiling tile, so as to overlap the inside edges of said grid elements; said sheet of rigid material of sufficient size to allow one or more cutouts, with said cutouts of sufficient size to allow the insertion of said junction boxes, and with means adapted for securing said junction boxes to said sheet of rigid material; a plurality of support members formed out of or attached to said sheet of rigid material with means adapted for rigidly securing said support members to said grid elements; whereby said bracket structure can rigidly support said junction boxes in said suspended ceiling.

2. The bracket structure of claim 1 wherein said support members are downwardly u-shaped hooks with means adapted to fit over and rigidly attach to the vertical flange of said grid elements.

3. The bracket structure of claim 1, further including a hole made near each corner in said sheet of rigid material, with said holes of sufficient size to allow a means to connect cable or chain from said holes to the building structure above said grid-type suspended ceiling, whereby providing additional balanced support of said sheet of rigid material.

4. The bracket structure of claim 1 wherein said sheet of rigid material is rectangular in shaped, whereby the two shorter sides and one longer side overlap the inside edges of said grid elements.

5. The bracket structure of claim 4, further including an upwardly bent lip formed out of said sheet of rigid material along said longer side that overlaps the inside edge of said grid element so as to allow said lip to lay flush against the vertical portion of said grid element, whereby said lip will provide additional rigidity to said sheet of rigid material.

6. The bracket structure of claim 5, further including a support angle member positioned adjacent to and along the side opposite said lip, comprising of a single piece of rigid material formed to have a horizontal portion with means provided to rigidly attach said horizontal portion to said rigid sheet of material, and an upwardly bent vertical portion; whereby said support angle member adds additional rigidity to said sheet of rigid material, and provides a means for the remaining portion of said ceiling tile to overlap said sheet of rigid material along the side opposite the lip, and abut the vertical portion of said support angle member.

* * * * *